United States Patent
Wagner et al.

(10) Patent No.: US 6,219,102 B1
(45) Date of Patent: Apr. 17, 2001

(54) WEIGHTED MEDIAN FILTER INTERPOLATOR

(75) Inventors: Peter Wagner, Waiblingen; Joerg Schwendowius; Klaus Zimmerman, both of Stuttgart; Oliver Erdler, Dortmund, all of (DE)

(73) Assignee: Sony International (Europe) GmbH, Köln (DE)

( * ) Notice: Subject to any disclaimer, the term of this patent is extended or adjusted under 35 U.S.C. 154(b) by 0 days.

(21) Appl. No.: 09/263,007

(22) Filed: Mar. 5, 1999

(30) Foreign Application Priority Data

Mar. 9, 1998 (EP) .................................................. 98104195

(51) Int. Cl.$^7$ ...................................................... H04N 7/01
(52) U.S. Cl. .......................................... 348/448; 348/452
(58) Field of Search ..................................... 348/448, 452, 348/441, 571, 607, 628; 382/236, 238

(56) References Cited

U.S. PATENT DOCUMENTS

| | | |
|---|---|---|
| 5,126,843 | 6/1992 | Tanaka . |
| 5,488,421 * | 1/1996 | Hwang et al. ........................ 348/448 |
| 5,889,890 * | 3/1999 | Heimburger ........................... 382/236 |
| 5,995,163 * | 11/1999 | Fossum ................................. 348/572 |

FOREIGN PATENT DOCUMENTS

| | | |
|---|---|---|
| 0 610 701 | 8/1994 | (EP) . |
| 0 629 083 | 12/1994 | (EP) . |

* cited by examiner

*Primary Examiner*—Victor R. Kostak
(74) *Attorney, Agent, or Firm*—Frommer, Lawrence & Haug, LLP.; William S. Frommer; Darren M. Simon

(57) ABSTRACT

A weighted median filter interpolator for the interlaced to progressive conversion of video signals is proposed in which for example depending on the available or processable source fields the filter interpolator mode can be set to realize either a three-tap weighted median interpolator or a five-tap weighted median interpolator by respective selection of the weights such that the number of median samples to be processed at a certain time is always an odd number. An increased output quality is achieved if in the case of the five-tap weighted median IPC filter mode a three-dimensional filter aperture is set spreading over a horizontal, a vertical and a temporal dimension of three consecutive fields of an incoming interlaced video signal.

6 Claims, 5 Drawing Sheets

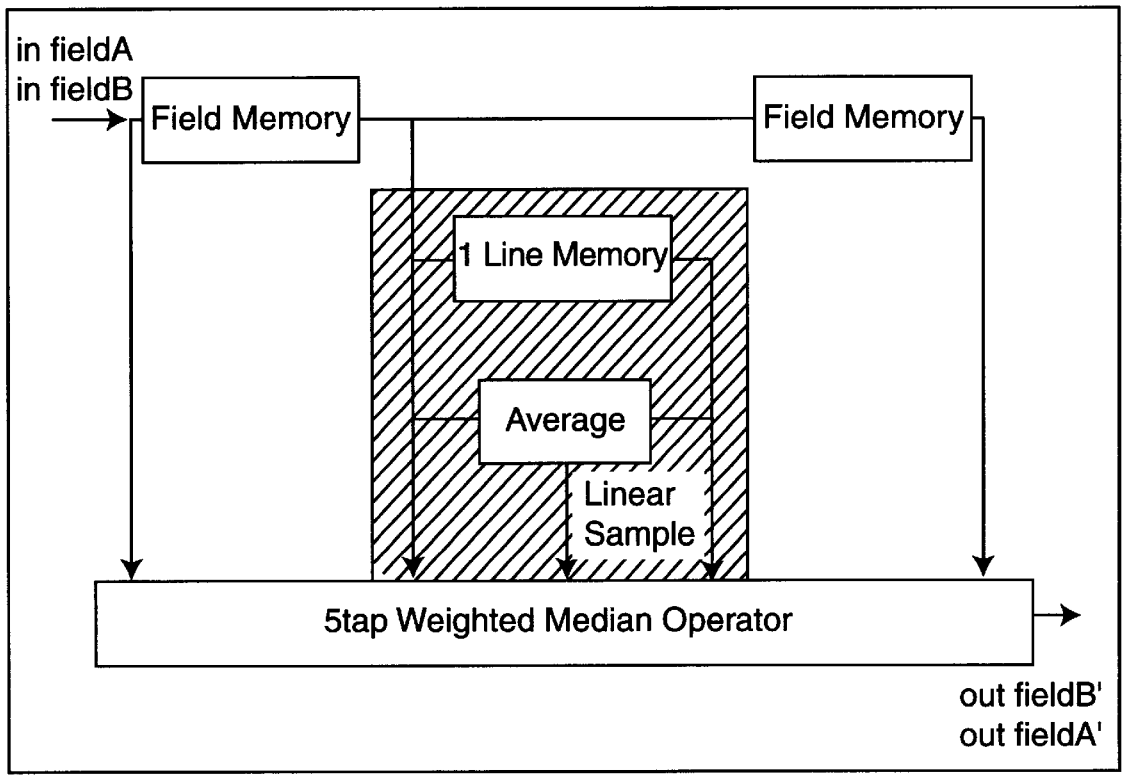
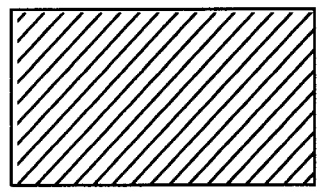
FIG. 2

| field A | field B | field C | field D |
|---|---|---|---|
| 1 | 2 | 1 (A) | 2 |
| 3 | 4 | 3 | 4 |
| 5 | 6 | 5 | 6 |
| 7 | 8 (B) | 7 | 8 |
| 9 to be delayed | 10 | 9 | 10 |
| 11 | 12 | 11 | 12 |
| 13 | 14 | 13 | 14 |
| 15 | 16 (C) | 15 | 16 |
| 17 | 18 | 17 | 18 |
| 19 (D) | 20 | 19 | 20 |
| 21 | 22 to be delayed | 21 | 22 |
| 23 | 24 | 23 | 24 |
| 25 | 26 | 25 | 26 |
| 27 | 28 to be delayed | 27 (E) | 28 to be delayed |
| 29 | 30 | 29 | 30 |
| 31 | 32 (F) | 31 | 32 |
| 33 | 34 | 33 | 34 | field lines are shown aligned as they come out of the field memories shaded areas are filter apertures this graphic shows the respective delay for incoming source lines A: 3tap med predecessor odd field comes in
B: 3tap med predecessor even field comes in
C: 3tap med successor even field comes in
D: 3tap med successor even field comes in
E: 5tap med vertical off field comes in
F: 5tap med vertical even field comes in

| = field to be interpolated "center of gravity"

▨ = source lines needed for IPC filter processing

FIG. 5

WEIGHTED MEDIAN FILTER INTERPOLATOR

DESCRIPTION

The invention relates to a weighted median filter interpolator, in particular for an interlaced to progressive conversion process of video signals.

Weighted median filters are known in the art (see e.g. Lit. [1]). They represent a more general approach to rank dependent median operators. The generalization relates to (a) sample dependent weight(s), which can be seen as a repetition operator of the respective samples. Following this understanding, a weight of "0" means, the respective sample is not considered in the ranking operation.

Interlaced to progressive conversion refers to the problem of interpolating the missing lines in an interlaced scanned video signal by use of a signal interpolation algorithm (IPC algorithm) to represent a resulting signal in a progressive scan raster. More or less motion insensitive methods for the scan raster conversion have been proposed and are known (see e.g. Lit. [2] and [3]).

For the IPC interpolation process, it is known to use so-called five-tap median filters. As disclosed in Lit. [2], the inputs to the filter are for example the corresponding pixels from the previous and the next frames, their linear average and the pixels from the line above and below. Similarly, three-tap median filters were also proposed for the 100 Hz interlaced to interlaced conversion (see Lit. [4]).

Problems with the known or formally proposed filters are their poor behaviour in either the temporal domain, i.e. poor motion portrayal and remaining flicker artifacts in progressive display modes, or in the spatial domain the loss of resolution and fuzzy vertical edges.

Based on the known proposal of weighted median filter approaches, it is an object of the present invention to improve interpolation filters proposed for the interlaced to progressive conversion of video signals in the direction of more flexibility depending on available source fields at a certain time.

A weighted median filter interpolator for the interlaced to progressive conversion of video signals is characterized according to the invention by means for adjusting specific filter modes by setting the weights such that the number of median samples to be processed at a certain time is always an odd number. Preferably, the weight of a single sample is either "0" or "1". As a most preferred embodiment, according to the invention a five-tap median filter is used of which the actual filter aperture depends on the selected filter mode defined by the respective number of sample weights according to the available source fields at a certain time.

According to the invention a specific set of weights is selected to define a specific IPC interpolation filter. Thus a general IPC interpolation filter provides according to a selected mode a specific output quality depending on the available source fields.

In particular, for a five-tap median interpolator, two sub-sets define two alternative interpolation filters included in a five-tap weighted median filter structure. For example, in the case of a five-tap weighted median IPC filter, a three-dimensional filter aperture is realizable spreading over a horizontal, a vertical and a temporal dimension of three consecutive fields of an incoming interlaced video signal, in particular if a spatial linear filter output sample is used. The actual filter aperture depends on the filter mode, and thus on the respective sample weights.

The filter behaviour varies with the modes depending on the weights of the source signal samples, which preferably are a top pixel T, a bottom pixel B, a previous (field) pixel P, a successive (field) pixel S and a linear source signal sample, which preferably is a horizontal/vertical linear filter sample.

The weight of a single sample can be either "0" or "1". The weight settings specified by the present invention are such that the number of median samples is always an odd number, i.e. preferably and in the case of a five-tap median filter "1", "3" or "5". By this selection according to the invention, the median operator becomes unambiguous. For example, if the number of weights="1" is three, then the median is derived from these three samples, whereas if the number of weights="1" is five, the median is derived from said five samples.

Specific and advantageous embodiments of the invention and further details thereof are described in the following with reference to the accompanying drawings, which however are not to be understood as a limitation of the invention, the scope of which is defined by the main claim(s) and as the case may be by dependent claims in additional consideration of the general knowledge of the expert in this field of IPC interpolation technology.

FIG. 1 visualizes three vertical-temporal scan raster modules by use of a five-tap weighted median filter of which the filter apertures are defined by three different settings:

FIG. 2 shows an IPC module with a five-tap weighted median operator in which the weights for all five-taps are set to "1";

Figure 6:
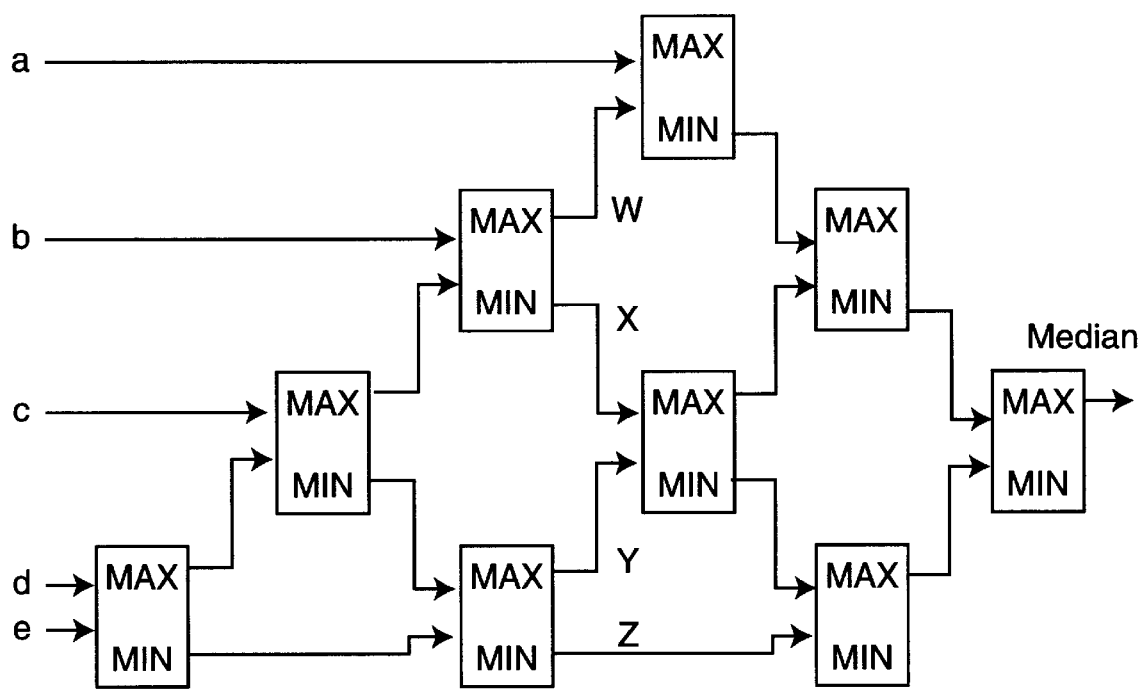
Figure 7:
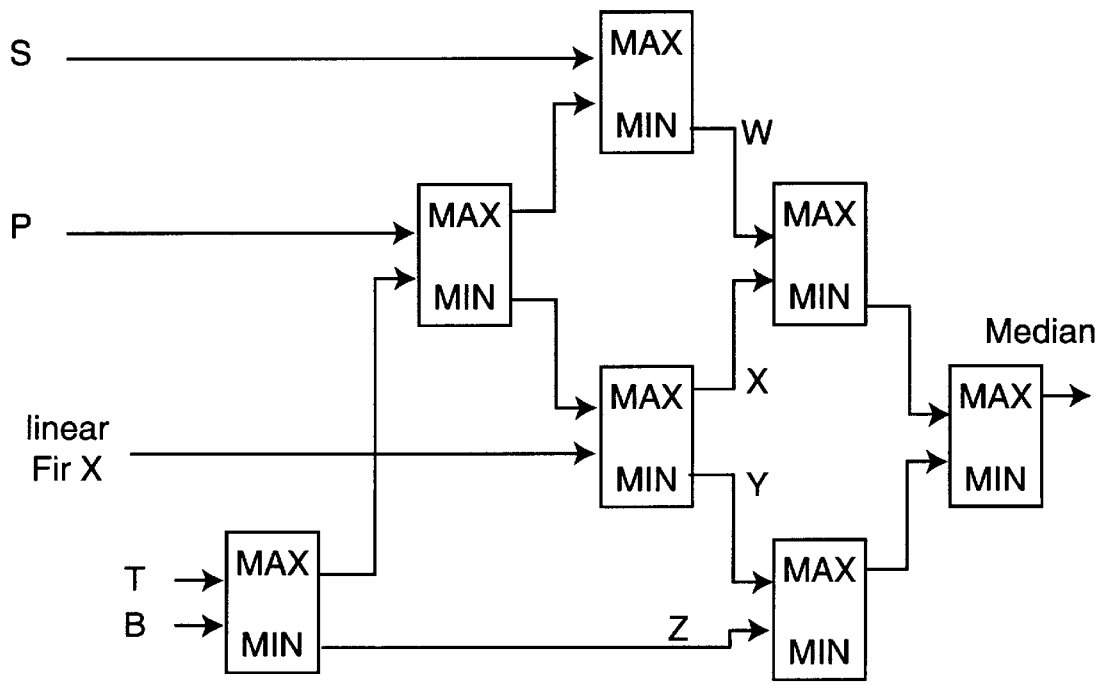

FIG. 5 visualizes a line delay scheme for an IPC filter synchronization with three and five weights of a multi-tap median operator being selected to be "1", respectively;

FIG. 6 depicts the basic version of a functional operator scheme to generate the median output of five input values by sorting-out the maximum three times; and FIG. 7 shows a modified version of a five-tap median operator realizing an algorithm for finding out the median of five input values, one of which uses the output of linear filter part.

In FIG. 1 to FIG. 4 the "center of gravity of the interpolator" or in other words the "center of filter operation" is underlayed and framed by a shaded area in each case.

Figure 1:
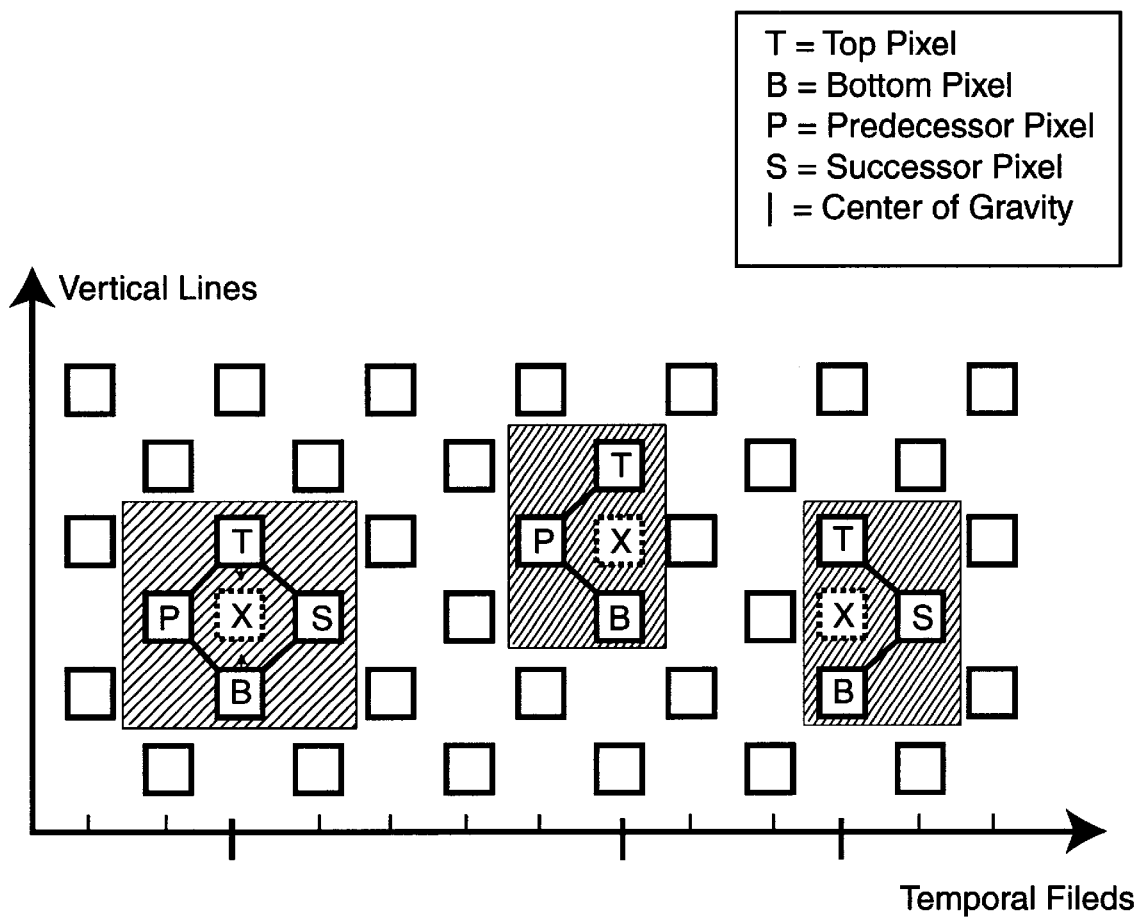

The left hand part of FIG. 1 shows the center of gravity to be applied to a five-tap median operator for which—in accordance with the invention—all weights are set to "1". Accordingly, the number of median samples is five. The filter accesses samples of three successive fields and the center of gravity is at the previous input field, thus causing a one-field output delay (see FIG. 2). For this "set 1" the median samples are taken from a top pixel T, a bottom pixel B, a previous (field) pixel P, a successive (field) pixel S and from a spatial linear filter output, in the present case a vertical filter sample FIR filtered according to the linear function FIR X=(T+B)/2.

As shown in FIG. 7, if compared against the basic version of a five input values median operator of FIG. 6, using the spatial linear filter output sample, two comparators may be saved thus simplifying the structure of the five-tap median operator, whereas in the case of FIG. 6 the median value is generated according to the function:

$$\text{MEDIAN }(a,b,c,d,e)=\text{MAX}\{\text{MIN}[\text{MIN}(a,W);\text{MAX}(X,Y)];\text{MAX}[\text{MIN}(X;Y);Z]\},$$

wherein

W=MAX{b; MAX[c;MAX(d;e)]}
 X=MIN{b; MAX[c;MAX(d;e)]}
 Y=MAX{MIN[c;MAX(d,e)]; MIN(d;e)}
 Z=MIN{MIN[c;MAX(d,e)]; MIN(d;e)}.

With the simplifying assumption $a \leq c \leq e$ or $e \leq c \leq d$ from FIG. 6, which leads to the following assumption in FIG. 7: $T \leq \text{linear} \leq B$ or $B \leq \text{linear} \leq T$, the five-tap median operator of FIG. 7 is defined by the more simplified function:

$$\text{MEDIAN}=\text{MAX}\{\text{MIN}(W,X),\text{MAX}(Y,Z)\},$$

wherein

W=MIN{S, MAX[P,MAX(T,B)]}
 X=MAX{MIN[P,MAX(T,B]; linear}
 Y=MIN{MIN[P,MAX(T,B)], linear}
 Z=MIN{T,B}.

Figure 3:
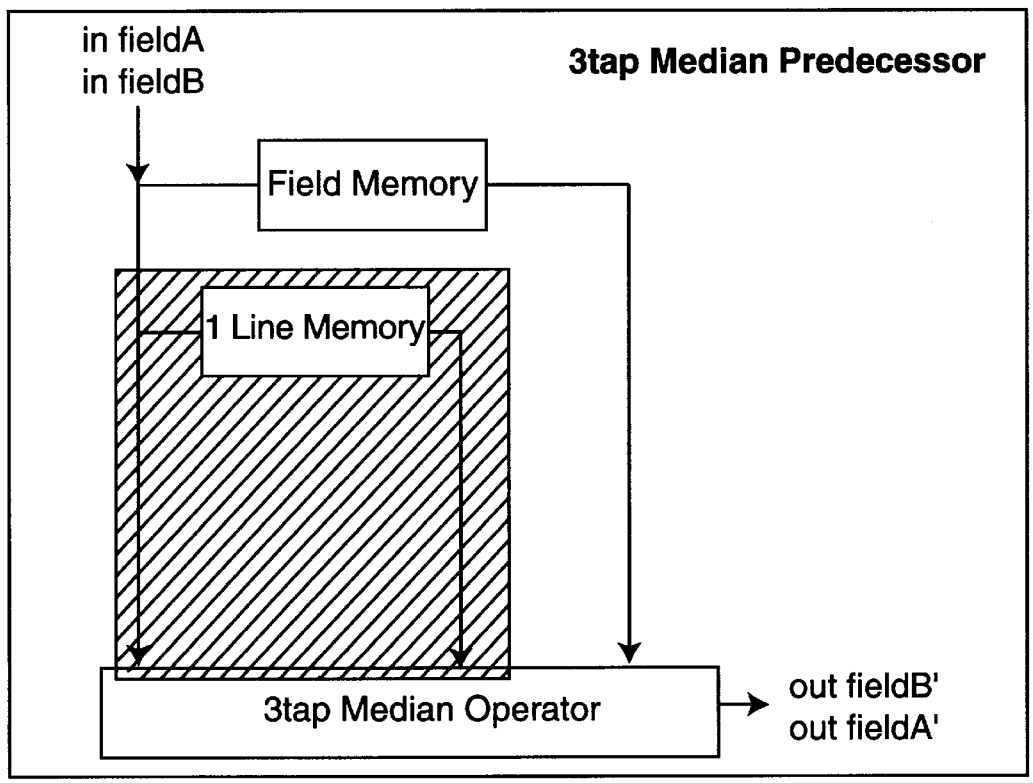
FIG. 3 depicts an IPC module with realization of a three-tap median operator and selection of the weights to be "1" for a top pixel T, a bottom pixel B and a previous pixel P (see central part of FIG. 1)

Referring again to FIG. 1, the middle part of this figure visualizes as "set 2" a three-tap median mode using a previous field sample by setting three of five possible weights to "1" and two weights to "0", i.e. T=1, B=1, P=1, S=0, linear=0. As shown in FIG. 3, thus an IPC module with a three-tap median operator is realized, which may be called a "three-tap median predecessor operator".

Figure 4:
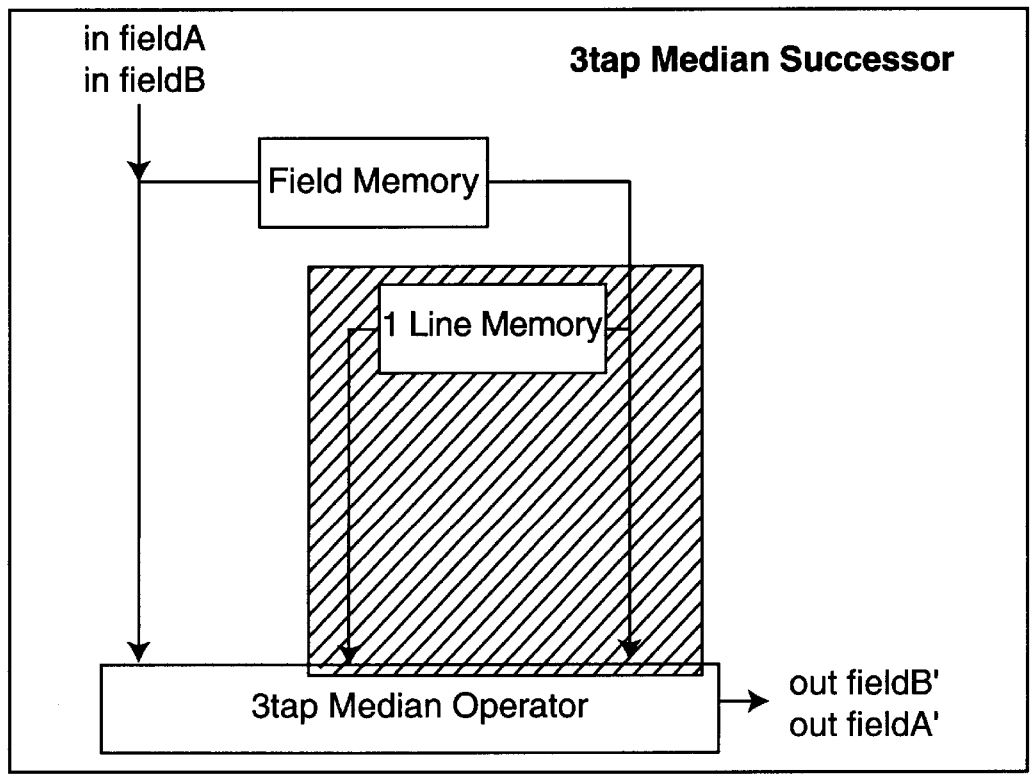
FIG. 4 shows an IPC module with realization of a three-tap median operator by selection of three weights to be "1", i.e. for consideration of a top pixel T, a bottom pixel B and a successor pixel S (see also right-hand picture part of FIG. 1)

Having again a look to the right hand part, FIG. 1 shows a third possible mode of operation by which the filter accesses samples of two successive fields and the center of gravity is at the current input field, thus causing no output delay. For this mode called "set 3", again three of the five possible weights are selected to be "1", i.e. T=1, B=1, S=1, whereas two weights are set to be "0", i.e., P=0 and linear=0. As shown in FIG. 4, by this setting an IPC module is realized that may be called "three-tap median successor operator".

The diagram of FIG. 5 visualizes the respective line and field delay(s) of each of the above explained IPC interpolation modes, i.e., for the three-tap median processor mode with
  case A: odd fields coming in,
  case B: even fields coming in;
 for the three tap median successor mode
  case C: odd fields coming in,
  case D: even fields coming in; and
 for the five-tap median mode with
  case E: vertical odd fields coming in,
  case F: even fields coming in.

The fields with gray underlaying refer to the source lines needed for a respective IPC filter processing, whereas a vertical crossbeam indicates the respective fields to be interpolated. The shaded areas also indicate the filter apertures for each case and the respective delay for the incoming source lines is also shown.

Using a weighted median filter interpolator according to the invention, the main advantages achieved are an improved IPC interpolation performance compared to median interpolators of the prior art and a higher flexibility for the adaptation to various source field situations. A particular advantage over prior art implementations is achieved with a three-dimensional filter aperture in the case where a linear sample used as one weight value for the median filter interpolator is generated as a spatial dimension sample. This is to be seen in contrast to the case in Lit. [2] where a linear sample generated as a purely temporal dimension sample is used as the fifth median sample. In this case, the temporal linear sample is derived as the average of the samples P and S.

PRIOR ART LITERATURE

Lit. [1] B. Arnold, N. Balakrishnan, H. Nagaraja: A first course in order statistics; JohnWiley & Sons, New York, 1992:

Lit. [2] K. Oeistaemoe and Y. Neuvo; A Motion Insensitive Method for Scan Rate Conversion and Cross Error Cancellation; IEEE Transactions on Consumer Electronics, Volume 37, No. 3, August 1991, pp. 296 to 300;

Lit. [3] U.S. Pat. No. 5,483,288

Lit. [4] G. de Haan, P. Biezen, O. Ojo: An Evolutionary Architecture for Motion-Compensated 100 Hz Television, IEEE Transactions on Circuits and Systems for Video Technology, Volume 5, No. 3, June 1995, pp. 207 to 217.

What is claimed is:

1. A weighted median filter interpolator for converting an interlaced video signal to a progressive video signal, comprising:

a five-tap median filter of which the filter aperture is based on a selected filter mode;

means for selecting said selected filter mode on a pixel by pixel basis by setting a weight for each of a plurality of video signal samples to either "0" or "1" so that the number of samples with corresponding "1" weights is always an odd number;

wherein said video signal samples for generating a median value are selected with weights "1" or "0" from a top pixel T, a bottom pixel B, a previous field pixel P, a successive field pixel S and from a spatial linear filter output sample FIR X.

2. The weighted median filter interpolator according to claim 1, wherein all five available video signal samples are selected with the weight "1".

3. The weighted median filter interpolator according to claim 1, wherein the number of video signal samples with weight "1" is three, and the other two video signal samples are set to "0".

4. The weighted median filter interpolator according to claim 3, wherein a three-tap median mode is selected with the following settings T=1, B=1, P=1, S=0 and FIR X=0.

5. The weighted median filter interpolator according to claim 3, wherein a three-tap median mode is selected with the following settings: T=1, B=1, P=0, S=1 and FIR X=0.

6. The weighted median filter interpolator according to claim 2, wherein the median of said five video signal samples is generated according to the function:

$$\text{MEDIAN}=\text{Max}\{\text{Min}(W,X);\text{Max}(Y,Z)\},$$

wherein

W=Min{S; Max[P; Max (T, B)]};
 X=Max{Min[P; Max (T, B]; FIR X};
 Y=Min{Min[P,Max (T, B)], FIR X};
 Z=Min{T, B}.

* * * * *

UNITED STATES PATENT AND TRADEMARK OFFICE
CERTIFICATE OF CORRECTION

PATENT NO. : 6,219,102 B1
DATED : April 17, 2001
INVENTOR(S) : Wagner et al.

Page 1 of 1

It is certified that error appears in the above-identified patent and that said Letters Patent is hereby corrected as shown below:

<u>Title page,</u>
Item [75] Inventors: Third-named inventor should read; Klaus Zimmermann

Signed and Sealed this

Thirtieth Day of October, 2001

Attest:

NICHOLAS P. GODICI
*Attesting Officer*   *Acting Director of the United States Patent and Trademark Office*